United States Patent [19]

Johansson et al.

[11] Patent Number: 5,275,633
[45] Date of Patent: Jan. 4, 1994

[54] CUTTING MEMBER AND METHOD OF MANUFACTURING SUCH MEMBER OF COMPACTED POWDER

[75] Inventors: Jan-Erik Johansson, Åshammar; Stig E. V. Lagerberg, Sandviken, both of Sweden; Lars T. Pettersson, Glen Rock, N.J.

[73] Assignee: Sandvik AB, Sandviken, Sweden

[21] Appl. No.: 425,237

[22] Filed: Oct. 23, 1989

[30] Foreign Application Priority Data

Oct. 21, 1988 [SE] Sweden ............................. 8803769

[51] Int. Cl.$^5$ ........................................... B24D 3/02
[52] U.S. Cl. ........................................ 51/309; 51/293; 51/298; 51/307
[58] Field of Search ............... 51/293, 298, 307, 309

[56] References Cited

U.S. PATENT DOCUMENTS

| | | | |
|---|---|---|---|
| 4,478,611 | 10/1984 | Selden | 51/307 |
| 4,496,372 | 1/1985 | Almond et al. | 51/309 |
| 4,629,373 | 12/1986 | Hall | 51/309 |
| 4,661,180 | 4/1987 | Frushour | 51/309 |
| 4,662,896 | 5/1987 | Dennis | 51/293 |
| 4,705,124 | 11/1987 | Abrahamson et al. | 51/309 |
| 4,713,286 | 12/1987 | Bunting et al. | 51/309 |
| 4,911,254 | 3/1990 | Keith | 51/309 |

Primary Examiner—William R. Dixon, Jr.
Assistant Examiner—Willie J. Thompson
Attorney, Agent, or Firm—Burns, Doane, Swecker & Mathis

[57] ABSTRACT

A cutting body is formed of compacted powder and has a lower side provided with a recess and a spaced protrusion. The body can be used as a cutting insert, or two identical such bodies can be sintered together to form an invertible cutting insert. Voids can be formed within the insert to contain sensors or conduct cooling fluid.

13 Claims, 2 Drawing Sheets

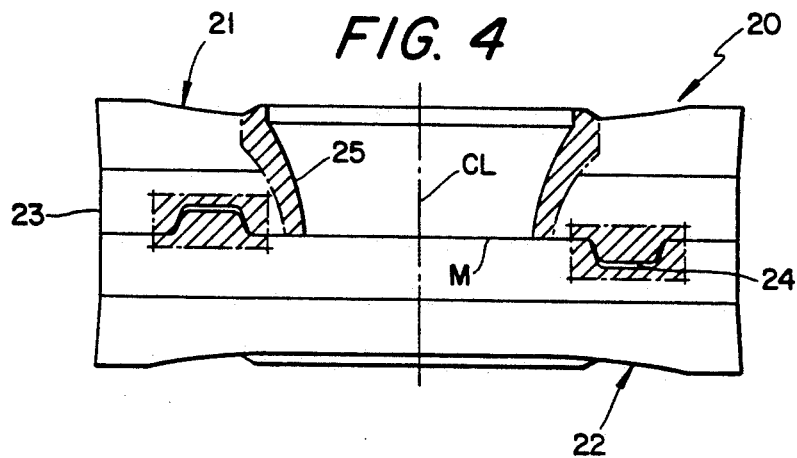
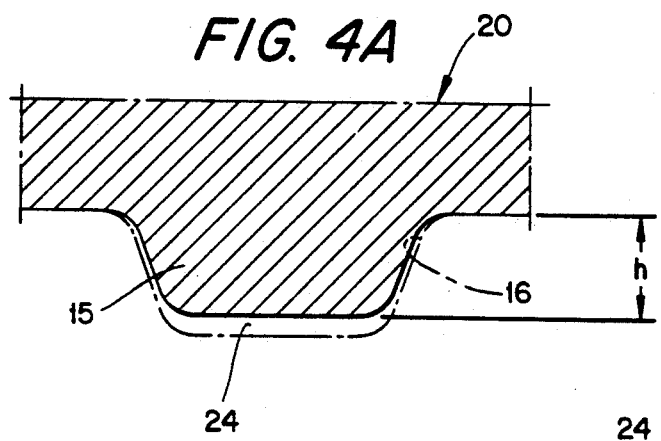
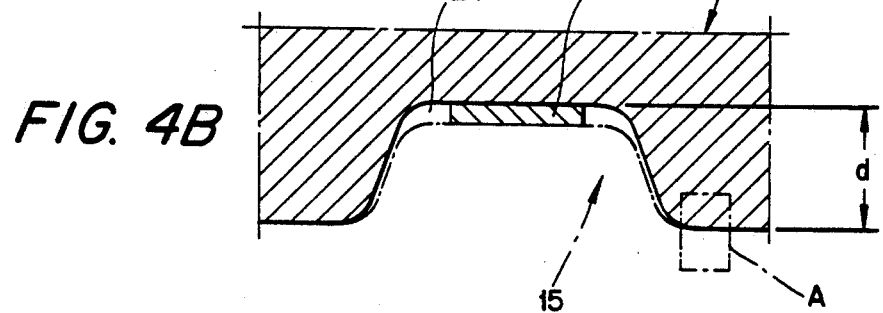
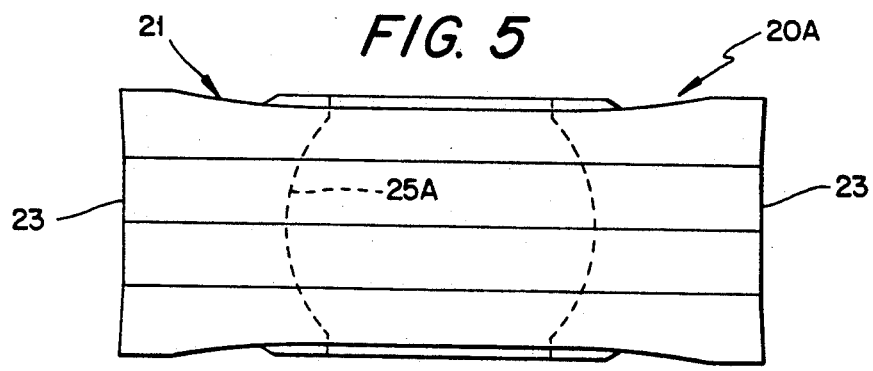

CUTTING MEMBER AND METHOD OF MANUFACTURING SUCH MEMBER OF COMPACTED POWDER

BACKGROUND AND OBJECTS OF THE INVENTION

The present invention relates to a cutting member and a method of manufacturing such a cutting member of compacted powder.

It is conventional to form a chipforming cutting insert of a compacted powder body which comprises a binder material and a hard material such as metal carbides, metal nitrides or ceramic material. The body is substantially disc-shaped and comprises an upper face, a lower face and at least one side surface connecting the upper and lower faces. The upper face is oriented at an acute angle with each side surface to form a cutting edge.

Heretofore, it has been practical to employ a powder-compacting technique to form single-sided inserts of the type described above. However, due to the complicated insert geometry of invertible inserts, it has not previously been practically possible to use conventional press tools for pressing such inserts of the invertible type, i.e., inserts having a double-positive geometry. By double-positive geometry is meant an insert whose upper and lower faces intersect the side faces at an acute angle to form cutting edges on both faces. That is, if such double-positive inserts were directly pressed in conventional press tools it would not be possible, without causing damage, to remove the powder body from the pressing tool after completion of the pressing.

In French Patent Application No. 1,522,955 a method of assembling two portions made of sintered metal powder is described. In accordance with that method two pieces are provided with compatible protrusions and recesses and the pieces are pressed and brazed together such that the protrusions and recesses become locked together by plastic deformation. Those two pieces are not identical in shape and therefore two different types for press tools must be used to their manufacture which makes this method time-consuming. Time-consumption is exacerbated due to the fact that braze material is introduced between the pieces before pressing takes place. That method cannot be used for assembling two powder bodies of hard material due to their brittleness prior to sintering. That is, the plastic deformation will create inner stresses in the material which are objectionable in the case of cemented carbide material for example, due to the small resistance to tensile stresses that is a typical characteristic of cemented carbide.

It is therefore an object of the present invention to enable a cutting member to be easily be produced by powder compaction.

It is another object of the invention to provide such a member which is useful as a blank for making a cutting insert.

It is another object to provide a double-sided cutting insert which inherently has necessary clearance angles.

It is another object of the invention to provide a simple method for the manufacture of a cutting insert having a complicated geometry.

SUMMARY OF THE INVENTION

These objects are achieved by the present invention which involves a disc body comprising a binder and a powder selected from the group comprising metal carbides, metal nitrides, and ceramics. The disc body comprises an upper face, a lower face, and at least one side surface intersecting the upper face at an acute angle. The lower face includes at least one recess and at least one protrusion which are spaced apart from one another and located on an imaginary circle having a center which coincides with a geometric center of the body.

Such a body can be used as a cutting insert, or two identical bodies can be sintered together to form an invertible cutting insert. In the latter case, the bodies are arranged such that the lower faces oppose one another and such that the protrusion of each body faces the recess of the other body. The bodies are mated together and are sintered to form a metallurgical bond therebetween.

Preferably, at least one internal void is formed within the insert prior to the sintering step. That void is adapted to receive a sensing device, or to form a channel for conducting cooling medium, and the like.

BRIEF DESCRIPTION OF THE DRAWING

The objects and advantages of the invention will become apparent from the following detailed description of preferred embodiments thereof in connection with the accompanying drawings in which like numerals designate like elements, and in which:

FIG. 4 is a side view partly in section of the cutting insert shown in FIG. 3;

FIGS. 4A and 4B represent enlarged cross-sectional views of different sections of the insert shown in FIG. 4;

FIG. 5 is a cross-sectional view of a second embodiment of an invertible insert according to the invention; and FIG. 6 is a photograph showing the microstructure of the transition zone in the area A between the two identical bodies at 1000× after being sintered together.

DETAILED DESCRIPTION OF PREFERRED EMBODIMENTS OF THE INVENTION

Figure 1:
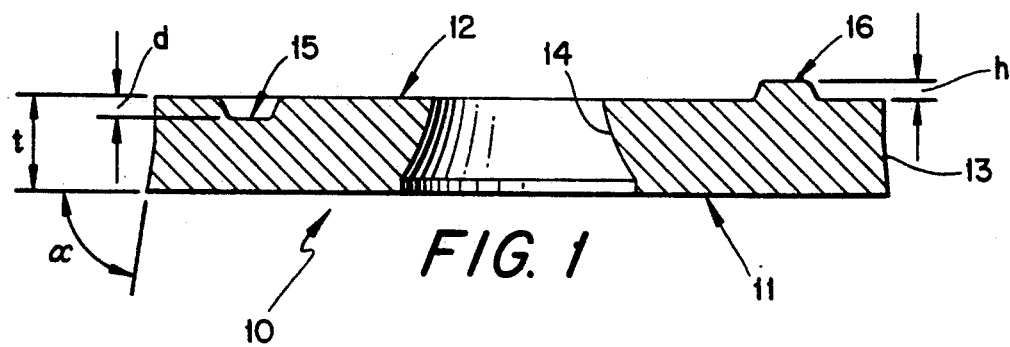
FIG. 1 is a sectional view of a compacted-powder body according to the invention taken along line I—I in FIG. 2, the body being suitable for use as a cutting insert, or for use as a blank in making an invertible cutting insert.
Figure 2:
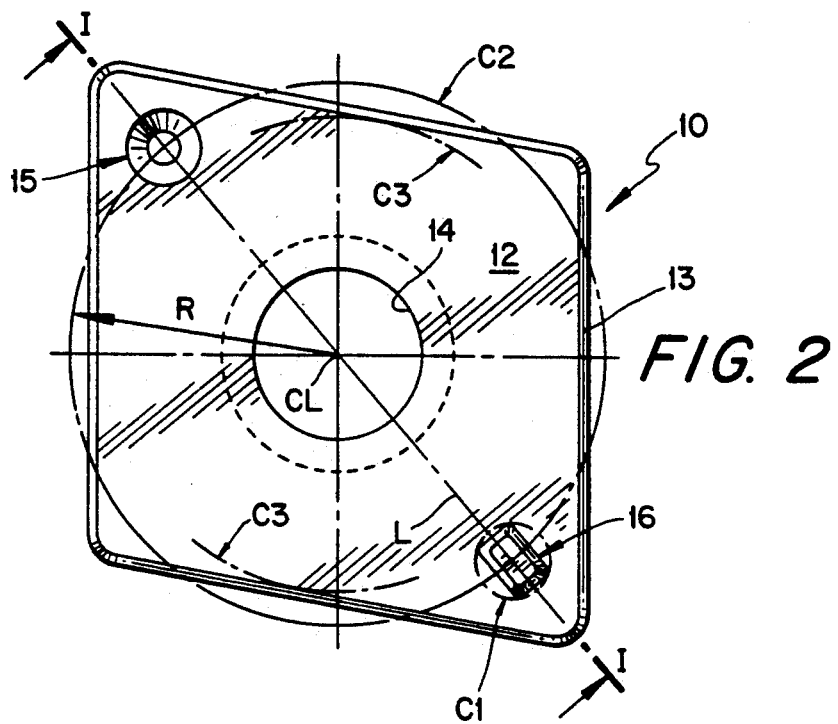
FIG. 2 is a bottom view of the body shown in FIG. 1.

FIGS. 1 and 2 show a compacted-powder body 10 after the powder has been compacted in a press tool (not shown) but before sintering. The body comprises a binder material and metal carbides, metal nitrides or ceramic material. The body is mainly a polygonally shaped disk comprising an upper face 11, a lower face 12 and a plurality of side surfaces 13 connecting the upper and lower faces. Alternatively, the body can be annularly shaped, with a single annular side surface connecting the upper and lower faces.

The upper face 11 intersects each side surface 13 at an acute edge angle α to define a cutting edge. The body 10 has a central aperture 14. The upper face could include integrally formed profiles such as chip formers (not shown), the shape of which can be freely chosen. The lower face 12 is mainly planar and comprises, in this illustrated case, one recess 15 and one spaced protrusion 16. Alternatively, several recesses and several protrusions could be provided.

The recess 15 has a circular cross-section and is provided with a decreasing diameter from the lower face 12 to the upper face 11. The recess has a depth d which should not exceed one-quarter of the thickness t of the body 10. The protrusion 16, which could have a cross-section complementary in shape to that of the recess, is in this case instead provided with a generally polygonal cross-section, the cross-sectional dimension of which decreases in a direction from both the upper face 11 and the lower face 12. The protrusion is, therefore, in the shape of a truncated pyramid. The height h of the protrusion from the lower face is at maximum one-quarter of the thickness t of the body while being somewhat less than the depth d of the recess 15. The protrusion 16 is provided with smoothly rounded corner portions which, as seen in a cross-section parallel with the lower face (FIG. 2), are positioned on a circle C1, the diameter of which is less than the largest cross-sectional diameter of the recess.

The recess and the protrusion are positioned on a circle C2, the center of which coincides with the center CL of the body 10. The radius R of the circle C2 is preferably larger than the radius of a standardized inscribed circle C3 of the body. When the body is of rectangular or rhombic shape, i.e., a four-cornered body, a straight line L can be drawn which intersects the protrusion 16, the recess 15 and the center CL. If the body is of triangular shape, such a line L would not pass through the center CL.

The body 10 can be used as a cutting insert, or it can be mated with another, identically shaped body to form a double-positive cutting insert. In the former case, the body would be sintered, thereby becoming suitable for chipforming machining and would be mounted on a shim plate provided with a corresponding recess and protrusion arranged to mate with the protrusion and recess of the body. In the case of making a double-positive insert, the body would be assembled with an identically shaped second compacted-powder body and subsequently sintered therewith to form an insert 20.

The method of manufacturing the insert 20 according to the invention is performed in the following manner. The compaction chamber of a conventional press (not shown) is first filled with powder, e.g., a powder which includes a binder material and a hard material such as metal carbides, metal nitrides, and ceramics. The press chosen would be one which is only capable of pressing inserts of negative form or simple positive form. The punch and the die are displaced towards each other so that the powder is compacted or packed. A brittle body 10 formed of such compacted powder is then removed from the chamber in a conventional way. The pressing procedure, which lasts a few seconds, is repeated on a new charge of powder so that two identical bodies 10 are obtained.

The lower faces 12 of the bodies 10 are then positioned opposite each other such that the recess 15 and the protrusion 16 of each body are located opposite the protrusion and recess of the other body. The bodies are thereafter displaced towards each other so that the lower faces 12 abut, and so that the protrusions are received in the recesses without there being anything more than a minimal contact therebetween, i.e., line contact is established between the wall of the recess and the inner corners of the protrusion (e.g., one such region of contact being designated by Box A in FIG. 4B). The thus-assembled unit is then inserted into a furnace and is heated to a suitable sintering temperature so that a sintering occurs, i.e., the lower sides, the protrusions and the recesses of the bodies are metallurgically bound together. The normal sintering condition for cemented carbides composed of 8–10% Co, 3–10% TiC+TaC+NbC, the rest WC is a temperature of from 1350° to 1500° C. in vacuum for a time period of from 0.5 to 2 hours.

Figure 3:
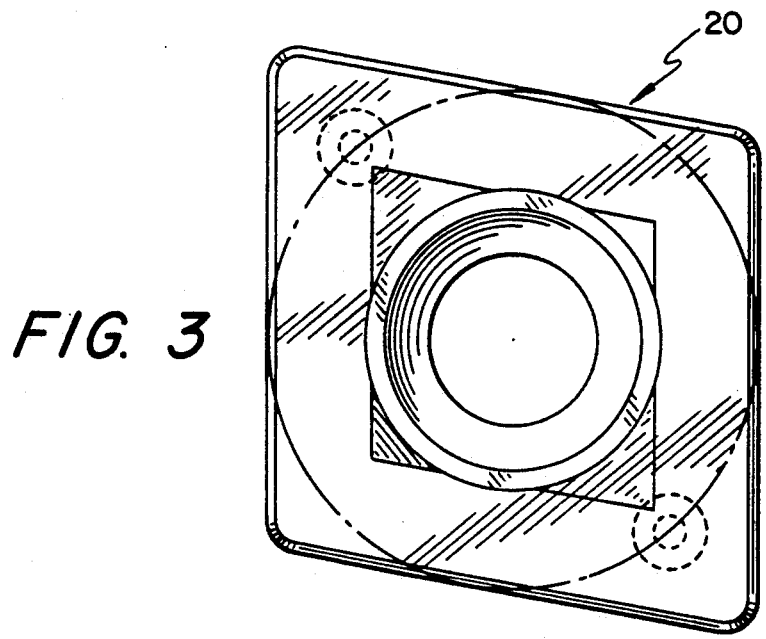
FIG. 3 is a plan view of an invertible or double-positive insert according to the invention.

That method makes possible the production of a double-positive insert (FIG. 4) having a fastening hole with a diameter decreasing toward the insert center away from the faces 21 and 22. FIGS. 3 to 4B show a completely sintered insert 20 according to the invention. The insert 20 i comprises two identical powder bodies which have been assembled and sintered together. The insert has a double-positive shape which means that upper faces 21 and the lower faces 22 of the insert are oriented at an acute angle $\alpha$ with the intersecting edge surfaces 23 which are defined by the side surfaces 13 of the two bodies. Hence, the insert is composed of two identical halves metallurgically bound to each other mainly along the central middle plane M of the insert.

As a further advantage of the present invention, the insert can be provided with one or more internal voids. In that regard, there is depicted in FIGS. 4A and 4B a void or gap 24 between the floor of the recess 15 and the tip of the protrusion 16 due to the fact that the height h of the protrusion 16 is about 0.1 mm less than the depth of the recess. The existence of such void(s) 24 assures that the faces 12 of the bodies will abut each other preparatory to the sintering step. That is, there is no risk of the protrusions bottoming-out in the recesses before the faces 12 contact one another. Furthermore, the voids 24 could be made to communicate with edge surfaces 23 via a channel (not shown) for the purpose of receiving sensors 30 such as electronic circuits in microscale for measurement of mechanical and/or thermal stresses. Special voids could be provided in the middle plane M for housing such sensors. Moreover, channels for conducting cooling media could simply be arranged within the middle plane M by providing slots in one or both of the powder bodies.

The insert of FIG. 4 has a central aperture 25 shaped symmetrically about its central axis CL with convex portions each of decreasing cross-sectional diameter towards the middle plane M. Alternatively, an aperture 25A of insert 20A could, as shown in FIG. 5, have concave portions of increasing diameter towards the middle plane.

Hence, the present invention involves a compacted-powder body and a cutting insert, and a method for their manufacture. The body and insert can be utilized for chipforming machining. The insert makes possible the use of a compacted-powder body with a double-positive geometry, and also makes possible new forms of inserts having voids and the inclusion of measurement sensors or cooling medium therein.

EXAMPLE

Compacted-powder bodies according to FIGS. 1–3 with projections and depressions on the lower face were prepared in four different compositions. Bodies of the same composition and shape were brought together in pairs and then sintered in a laboratory furnace under the following conditions, wherein "h" is hours:

| Composition | Sintering Conditions |
| --- | --- |
| 8% Co, rest WC | 1410° C., 1 h, vacuum |
| 9.5% Co, 3.5% TiC + TaC + NbC, rest WC | 1450° C., 1 h, vacuum |
| 5.5% Co, 8.5% TiC + TaC + NbC, rest WC | 1450° C., 1 h, vacuum |
| 10% Co, 6% TiC + TaC + NbC, rest, WC | 1450° C., 1 h, vacuum |

The sintered inserts were cut and polished and the transition zone between the two original halves was studied in a light microscope and also in a scanning electron microscope. It was found that the two halves of each insert had sintered together completely. The transition zone could be seen as a cobalt band with little or no residual porosity. In some instances, the transition zone was almost invisible. An example of a transition zone is shown in FIG. 6.

Although the present invention has been described in connection with preferred embodiments thereof, it will be appreciated by those skilled in the art that additions, modifications, substitutions, and deletions not specifically described may be made without departing from the spirit and scope of the invention as defined in the appended claims.

What is claimed is:

1. A disk body comprising a binder and a powder selected from the group comprising metal carbides, metal nitrides and ceramics, said disk body comprising an upper face, a lower face, and at least one side surface intersecting said upper face at an acute angle to form therewith a cutting edge, said lower face including at least one recess extending toward said upper face and at least one protrusion extending away from said upper face, said recess and protrusion being spaced apart from one another and located on an imaginary circle having a center which coincides with a geometric center of said body, said protrusion being of enlarging cross-section in a direction toward said upper face, said recess being of diminishing cross-section in a direction toward said upper face.

2. A body according to claim 1, wherein said recess and protrusion are of different cross-sectional configurations.

3. A body according to claim 1, wherein said geometric center, said protrusion, and said recess are located on a common imaginary straight line.

4. A body according to claim 1, wherein said recess has a circular cross-section and a depth relative to said lower face, said protrusion having the shape of a truncated pyramid and a height relative to said lower face, said depth being greater than said height.

5. An invertible cutting insert for chipforming machining formed of hard material, said insert including opposed upper and lower surfaces and at least one edge surface disposed therebetween, each of said upper and lower surfaces intersecting said edge surface at an acute angle to form cutting edges therewith, said insert comprising two identical compacted-powder bodies sintered together to form a metallurgical bond along a middle plane of the insert, said insert including at least one internal void which is spaced inwardly of said upper and lower surfaces and said edge surface and is offset relative to a center line of the insert.

6. An invertible cutting insert according to claim 5, wherein said insert includes a central hole adapted to receive a fastener, said hole having a cross-sectional area which changes toward said middle plane.

7. An invertible cutting insert according to claim 5, wherein sensing means is disposed in said void.

8. A method of manufacturing an invertible cutting insert comprising the steps of forming two identical compacted-power bodies, each body comprising upper and lower faces interconnected by at least one side surface which forms an acute angle with said upper face to form a cutting edge therewith, each said lower face including a projection and a recess spaced therefrom, said protrusion extending away from said upper face, and said recess extending toward said upper face, said protrusion tapering in a direction away from said upper face, and said recess tapering toward said upper face, placing said lower faces together such that said tapering protrusion of each body enters said tapering recess of the other body, and sintering said bodies together to form a metallurgical bond therebetween.

9. A method according to claim 8 including the step of forming at least one internal void in said insert prior to said sintering step which remains following said sintering step, said void being spaced inwardly from said upper and lower faces and said side surface.

10. A method according to claim 8 including the step of spacing an end of each of said protrusions from a floor of their respective recesses to form two internal voids in said insert prior to said sintering step.

11. A method according to claim 8, wherein each of said bodies is formed by inserting powder in a press, and said assembled bodies are heated to a sintering temperature of from 1350° to 1500° C. for a time period of from 0.5 to 2 hours.

12. A method according to claim 11, wherein each of said bodies is formed such that said recess and said protrusion lie on an imaginary line which also passes through a geometric center of said body.

13. A method of manufacturing an invertible cutting insert comprising the steps of forming two identical compacted-powder bodies, each body comprising upper and lower faces interconnected by at least one side surface which forms an acute angle with said upper face to form a cutting edge therewith, placing said lower faces together to form an assembly of said bodies with at least one void formed internally therein so as to be spaced inwardly from said upper and lower faces and said side surface, and sintering said bodies together to form a metallurgical bond therebetween, with said internal void remaining after said sintering step.

* * * * *